United States Patent
Perry et al.

(10) Patent No.: US 9,894,114 B2
(45) Date of Patent: Feb. 13, 2018

(54) ADJUSTING THE DISPLAY OF SOCIAL MEDIA UPDATES TO VARYING DEGREES OF RICHNESS BASED ON ENVIRONMENTAL CONDITIONS AND IMPORTANCE OF THE UPDATE

(71) Applicant: International Business Machines Corporation, Armonk, NY (US)

(72) Inventors: Ethan L. Perry, Lexington, MA (US); Josef Scherpa, Fort Collins, CO (US); Andrew L. Schirmer, Andover, MA (US)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 13/740,565

(22) Filed: Jan. 14, 2013

(65) Prior Publication Data

US 2014/0201272 A1    Jul. 17, 2014

(51) Int. Cl.
*G06F 3/0484* (2013.01)
*H04L 29/06* (2006.01)
(Continued)

(52) U.S. Cl.
CPC .......... *H04L 65/403* (2013.01); *G06F 3/0484* (2013.01); *G06Q 30/0259* (2013.01);
(Continued)

(58) Field of Classification Search
CPC . G06F 3/0484; H04L 65/403; G06Q 30/0267; G06Q 30/0259; G06Q 30/0261; G06Q 50/01
(Continued)

(56) References Cited

U.S. PATENT DOCUMENTS 7,669,123 B2    2/2010 Zuckerberg et al.
7,693,906 B1 *  4/2010 Amidon ............ G06F 17/30038
                                    707/749
(Continued)

FOREIGN PATENT DOCUMENTS

CN    102105858 A    6/2011
CN    102204286 A    9/2011
CN    102388396 A    3/2012

OTHER PUBLICATIONS

"MD5," http://en.wikipedia.org/wiki/MD5, 2013, pp. 1-18.
(Continued)

*Primary Examiner* — Oanh Duong
(74) *Attorney, Agent, or Firm* — Robert A. Voigt, Jr.; Winstead, P.C.

(57) ABSTRACT

A method, system and computer program product for adjusting a display of social media updates to varying degrees of richness. A level of importance for each social media update is identified and assigned to the update. The importance of the social media update can be defined by various aspects, such as topics or people of interest to the user. Furthermore, a current condition of a user's environment (e.g., current workload of the user) is determined. The social media updates are then displayed in a social networking feed with a particular degree of richness at a particular location based on the level of importance of the social media updates, the current condition of the user's environment, and/or the user's interactions with existing updates currently displayed. In this manner, the amount of time required by the user to determine which updates are important to the user is reduced.

14 Claims, 6 Drawing Sheets

(51) Int. Cl.
*G06Q 50/00* (2012.01)
*G06Q 30/02* (2012.01)

(52) U.S. Cl.
CPC ..... *G06Q 30/0261* (2013.01); *G06Q 30/0267* (2013.01); *G06Q 50/01* (2013.01)

(58) Field of Classification Search
USPC ................................. 709/204, 223–224, 246
See application file for complete search history.

(56) References Cited

U.S. PATENT DOCUMENTS

| | | | |
|---|---|---|---|
| 7,743,340 B2 * | 6/2010 | Horvitz | G05B 19/404 715/710 |
| 7,962,555 B2 | 6/2011 | Sastry et al. | |
| 8,332,477 B1 | 12/2012 | Kaiserlian et al. | |
| 8,560,554 B2 * | 10/2013 | Gradin et al. | 707/748 |
| 2008/0028027 A1 | 1/2008 | Jachner | |
| 2010/0017483 A1 | 1/2010 | Estrada | |
| 2010/0100904 A1 * | 4/2010 | Kawakami et al. | 725/37 |
| 2010/0153855 A1 | 6/2010 | Roberts et al. | |
| 2010/0268830 A1 * | 10/2010 | McKee et al. | 709/228 |
| 2011/0058101 A1 | 3/2011 | Earley et al. | |
| 2011/0225170 A1 | 9/2011 | Obasanjo et al. | |
| 2011/0282952 A1 | 11/2011 | Song | |
| 2012/0005221 A1 | 1/2012 | Ickman et al. | |
| 2012/0078917 A1 | 3/2012 | Gradin et al. | |
| 2012/0136866 A1 * | 5/2012 | Carter et al. | 707/740 |
| 2012/0143948 A1 * | 6/2012 | Archambault et al. | 709/204 |
| 2012/0151320 A1 * | 6/2012 | McClements, IV | 715/230 |
| 2012/0158843 A1 | 6/2012 | Angani et al. | |
| 2012/0158863 A1 * | 6/2012 | Kikin-Gil et al. | 709/206 |
| 2012/0272160 A1 * | 10/2012 | Spivack et al. | 715/752 |
| 2012/0311033 A1 * | 12/2012 | Tseng | 709/204 |
| 2012/0317091 A1 | 12/2012 | Li | |
| 2013/0006973 A1 | 1/2013 | Caldwell et al. | |
| 2013/0024780 A1 | 1/2013 | Sutedja et al. | |
| 2013/0031034 A1 | 1/2013 | Gubin et al. | |
| 2013/0061156 A1 * | 3/2013 | Olsen et al. | 715/753 |
| 2013/0103667 A1 | 4/2013 | Minh | |
| 2013/0103773 A1 * | 4/2013 | Tsukidate | 709/206 |
| 2013/0124653 A1 | 5/2013 | Vick et al. | |
| 2013/0212059 A1 | 8/2013 | Ameri-Yahia et al. | |
| 2013/0297689 A1 * | 11/2013 | Bhat et al. | 709/204 |
| 2014/0201216 A1 | 7/2014 | Bryant et al. | |
| 2015/0081713 A1 | 3/2015 | Alonso et al. | |
| 2015/0281163 A1 | 10/2015 | Bastide et al. | |
| 2016/0065519 A1 | 3/2016 | Waltermann et al. | |
| 2016/0080485 A1 | 3/2016 | Hamedi | |

OTHER PUBLICATIONS

"Introducing Zite 2.0," http://blog.zite.com/2012/12/04/introducing-zite-2-0, Dec. 4, 2012.

Balali et al., "A Supervised Approach to Predict the Hierarchical Structure of Conversation Threads for Comments," Hindawi Publishing Corporation, The Scientific World Journal, Tehran, Iran, IP.com, 3942392, Feb. 11, 2014, pp. 1-23, see abstract and pp. 1, 2, 3 and 4.

Microsoft, "Threaded IM," IPCOM000224899D, Jan. 10, 2013, pp. 1-4, see summary and p. 2.

Office Action for U.S. Appl. No. 14/063,874 dated Oct. 22, 2014, pp. 1-17.

Office Action for U.S. Appl. No. 14/063,874 dated Feb. 12, 2015, pp. 1-21.

Office Action for U.S. Appl. No. 14/063,874 dated May 20, 2015, pp. 1-17.

Office Action for U.S. Appl. No. 14/610,802 dated Sep. 23, 2016, pp. 1-39.

Office Action for U.S. Appl. No. 14/333,706 dated Sep. 22, 2016, pp. 1-49.

Office Action for U.S. Appl. No. 14/063,874 dated Nov. 19, 2015, pp. 1-18.

Office Action for U.S. Appl. No. 14/610,802 dated Apr. 20, 2017, pp. 1-18.

Office Action for U.S. Appl. No. 14/333,706 dated Apr. 19, 2017, pp. 1-22.

Office Action for U.S. Appl. No. 14/702,490 dated May 3, 2017, pp. 1-40.

Office Action for U.S. Appl. No. 14/523,199 dated Jun. 30, 2017, pp. 1-59.

* cited by examiner

ADJUSTING THE DISPLAY OF SOCIAL MEDIA UPDATES TO VARYING DEGREES OF RICHNESS BASED ON ENVIRONMENTAL CONDITIONS AND IMPORTANCE OF THE UPDATE

TECHNICAL FIELD

The present invention relates generally to social network services, and more particularly to adjusting the display of social media updates to varying degrees of richness based on environmental conditions and importance of the update.

BACKGROUND

A social network service is an online service, platform or site that focuses on building and reflecting of social networks or social relations among people (e.g., those who share interests and/or activities). A social network service essentially consists of a representation of each user (often a profile), his/her social links, and a variety of additional services. Most social network services are web based and provide means for users to interact over the Internet, such as by e-mail and instant messaging. Social networking sites allow users to share ideas, activities, events, and interests within their individual networks.

Social networking sites (e.g., Facebook®) present to a particular user the posts and stories by other users in a social networking feed (referred to as a "news feed"). New postings or updates from friends and pages followed by the user (including photo tags, event updates, group memberships and other activity) will be reflected in the news feed. If a news feed contains multiple updates, it is likely that the relative importance of each update differs to the user, depending on the topic, associated people, etc. However, if all the updates are displayed to the user with the same level of richness (referring to the amount of detail, visual display size, etc.), then the user has to spend a great deal of time in reviewing the updates to determine which of the updates are important to the user and to process the information of value.

Currently, social collaboration tools attempt to manage attention and volume of the postings in the news feed by "rolling up" similar posts or stories into a summarized update (e.g., "ten people liked a file") rather than providing a unique entry for each update. However, the summarized update may involve summarizing a high volume of unrelated content updates which may not have a common basis for rolling up. Furthermore, users may desire to see the update entry, especially if the update is important to the user.

BRIEF SUMMARY

In one embodiment of the present invention, a method for adjusting a display of social media updates to varying degrees of richness comprises receiving a social media update. The method further comprises identifying a level of importance of the social media update. Additionally, the method comprises determining a current condition of a user's environment. In addition, the method comprises displaying, by a processor, the social media update in a social networking feed with a particular degree of richness at a particular location based on the identified level of importance of the social media update and/or the current condition of the user's environment.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which:

FIG. 5 illustrates a display of a social media update in a social networking feed with a high degree of richness in accordance with an embodiment of the present invention;

FIG. 6 illustrates a display of a social media update in a social networking feed with a low degree of richness in accordance with an embodiment of the present invention.

DETAILED DESCRIPTION

The present invention comprises a method, system and computer program product for adjusting a display of social media updates to varying degrees of richness. In one embodiment of the present invention, a level of importance for a social media update is identified and assigned to the social media update. The importance of the social media update can be defined by various aspects, such as topics or people of interest to the user, the user's work assignments, topics related to what the user has already read, etc. Furthermore, a current condition of a user's environment is determined. For example, the current condition of the user's environment may include a volume of other updates received over a time frame, a current workload of the user, a current time or day, etc. The social media update is then displayed in a social networking feed at a particular location with a particular degree of richness based on the level of importance of the social media update and/or the current condition of the user's environment. In this manner, the amount of time required by the user to determine which updates are important to the user is reduced.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
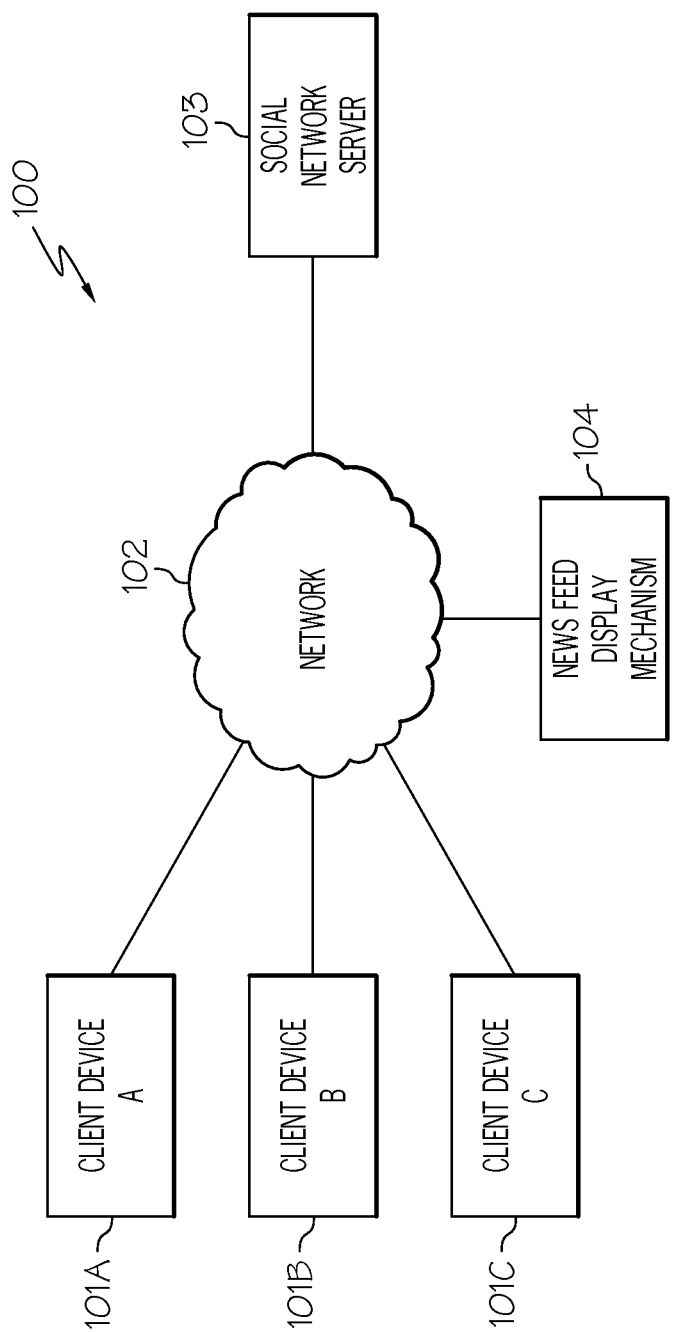
FIG. 1 illustrates a social network system configured in accordance with an embodiment of the present invention.

Referring now to the Figures in detail, FIG. 1 illustrates a social network system 100 configured in accordance with an embodiment of the present invention. Referring to FIG. 1, social network system 100 includes a community of users using client devices 101A-101C (identified as "Client Device A," "Client Device B," and "Client Device C," respectively, in FIG. 1) to be involved in social network system 100. Client devices 101A-101C may collectively or individually be referred to as client devices 101 or client device 101, respectively. Client device 101 may be a portable computing unit, a Personal Digital Assistant (PDA), a smartphone, a laptop computer, a mobile phone, a navigation device, a game console, a desktop computer system, a workstation, an Internet appliance and the like.

Client devices 101 may participate in a social network by communicating (by wire or wirelessly) over a network 102, which may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

System 100 further includes a social network server 103, which may be a web server configured to offer a social networking and/or microblogging service, enabling users of client devices 101 to send and read other users' posts. "Posts," as used herein, include any one or more of the following: text (e.g., comments, sub-comments and replies), audio, video images, etc. Social network server 103 is connected to network 102 by wire or wirelessly. While FIG. 1 illustrates a single social network server 103, it is noted for clarity that multiple servers may be used to implement the social networking and/or microblogging service.

System 100 further includes a news feed display mechanism 104 connected to network 102 by wire or wirelessly. News feed display mechanism 104 is configured to adjust the display of a social media update in a social networking feed to a particular degree of richness (i.e., a level of detail) based on the level of importance of the social media update and/or the current condition of the user's environment as discussed in further detail below. A description of the hardware configuration of news feed display mechanism 104 is provided below in connection with FIG. 2.

System 100 is not to be limited in scope to any one particular network architecture. System 100 may include any number of clients 101, networks 102, social network servers 103 and news feed display mechanisms 104. Furthermore, in one embodiment, news feed display mechanism 104 may be part of social network server 103.

Figure 2:
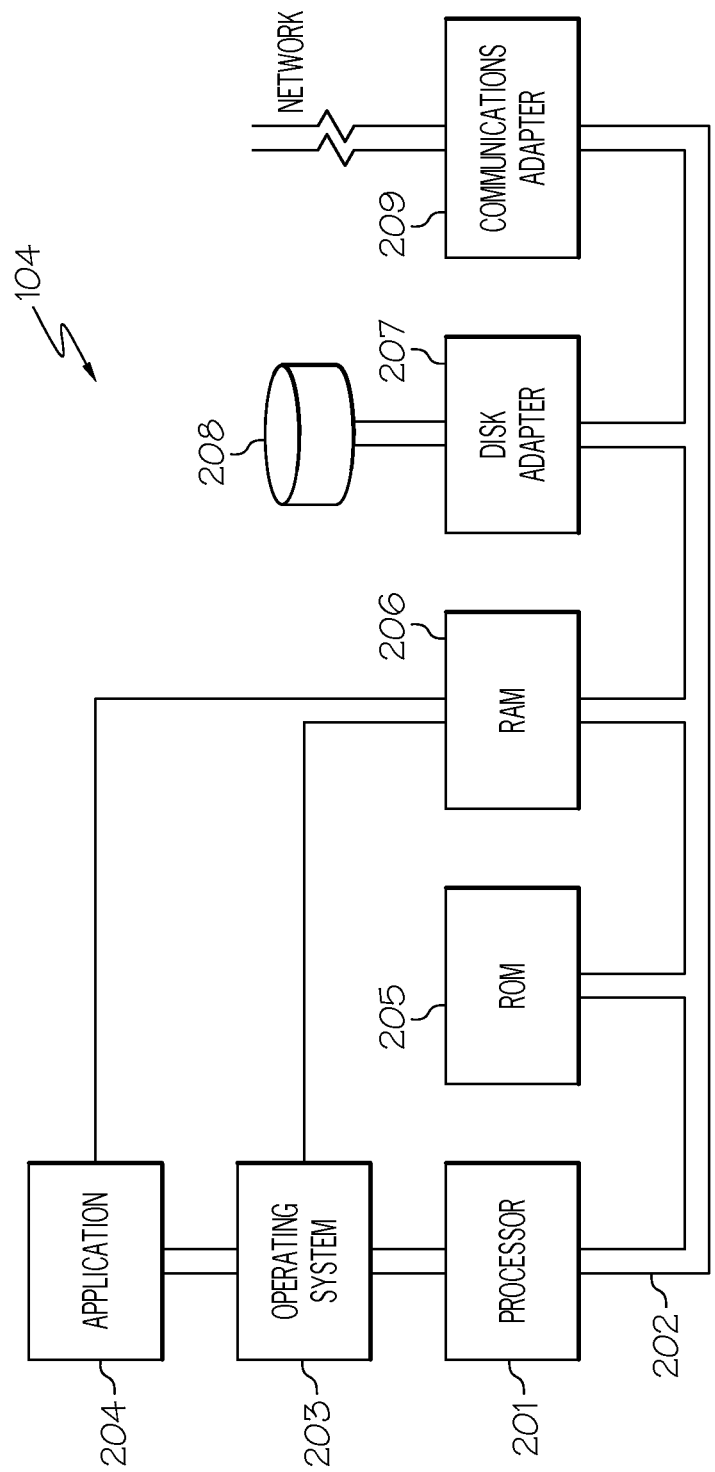
FIG. 2 illustrates a hardware configuration of a news feed display mechanism configured in accordance with an embodiment of the present invention.

Referring now to FIG. 2, FIG. 2 illustrates a hardware configuration of a news feed display mechanism 104 (FIG. 1) which is representative of a hardware environment for practicing the present invention. Referring to FIG. 2, news feed display mechanism 104 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for adjusting the display of a social media update in a social networking feed to a particular degree of richness based on the level of importance of the social media update and/or the current condition of the user's environment, as discussed further below in association with FIGS. 3-7.

Referring again to FIG. 2, read-only memory ("ROM") 205 is coupled to system bus 202 and includes a basic input/output system ("BIOS") that controls certain basic functions of news feed display mechanism 104. Random access memory ("RAM") 206 and disk adapter 207 are also coupled to system bus 202. It should be noted that software components including operating system 203 and application 204 may be loaded into RAM 206, which may be news feed display mechanism's 104 main memory for execution. Disk adapter 207 may be an integrated drive electronics ("IDE") adapter that communicates with a disk unit 208, e.g., disk drive. It is noted that the program for adjusting the display of a social media update in a social networking feed to a particular degree of richness based on the level of importance of the social media update and/or the current condition of the user's environment, as discussed further below in association with FIGS. 3-7, may reside in disk unit 208 or in application 204.

News feed display mechanism 104 may further include a communications adapter 209 coupled to bus 202. Communications adapter 209 interconnects bus 202 with an outside network (e.g., network 102 of FIG. 1) thereby allowing news feed display mechanism 104 to communicate with client devices 101 and social network server 103.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, social networking sites (e.g., Facebook®) present to a particular user the posts and stories by other users in a social networking feed (referred to as a "news feed"). New postings or updates from friends and pages followed by the user (including photo tags, event updates, group memberships and other activity) will be reflected in the news feed. If a news feed contains multiple updates, it is likely that the relative importance of each update differs to the user, depending on the topic, associated people, etc. However, if all the updates are displayed to the user with the same level of richness (referring to the amount of detail, visual display size, etc.), then the user has to spend a great deal of time in reviewing the updates to determine which of the updates are important to the user. Currently, social collaboration tools attempt to manage attention and volume of the postings in the news feed by "rolling up" similar posts or stories into a summarized update (e.g., "ten people liked a file") rather than providing a unique entry for each update. However, the summarized update may involve summarizing a high volume of unrelated content updates which may not have a common basis for rolling up. Furthermore, users may desire to see the update entry, especially if the update is important to the user.

Figure 3:
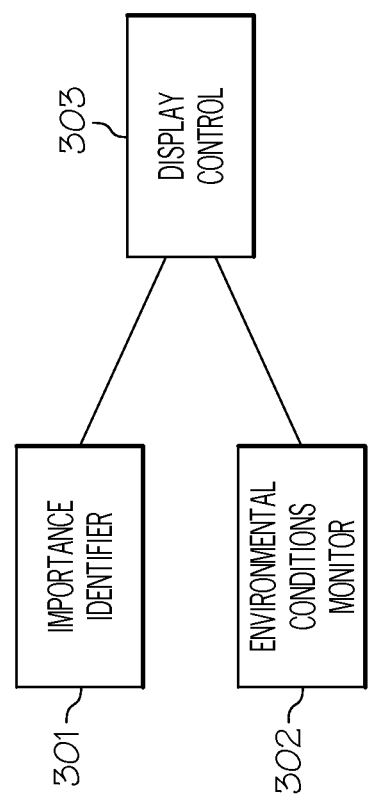
FIG. 3 illustrates the software components used in adjusting the display of social media updates to varying degrees of richness based on the level of importance of the social media update and/or the current condition of the user's environment in accordance with an embodiment of the present invention.
Figure 4:
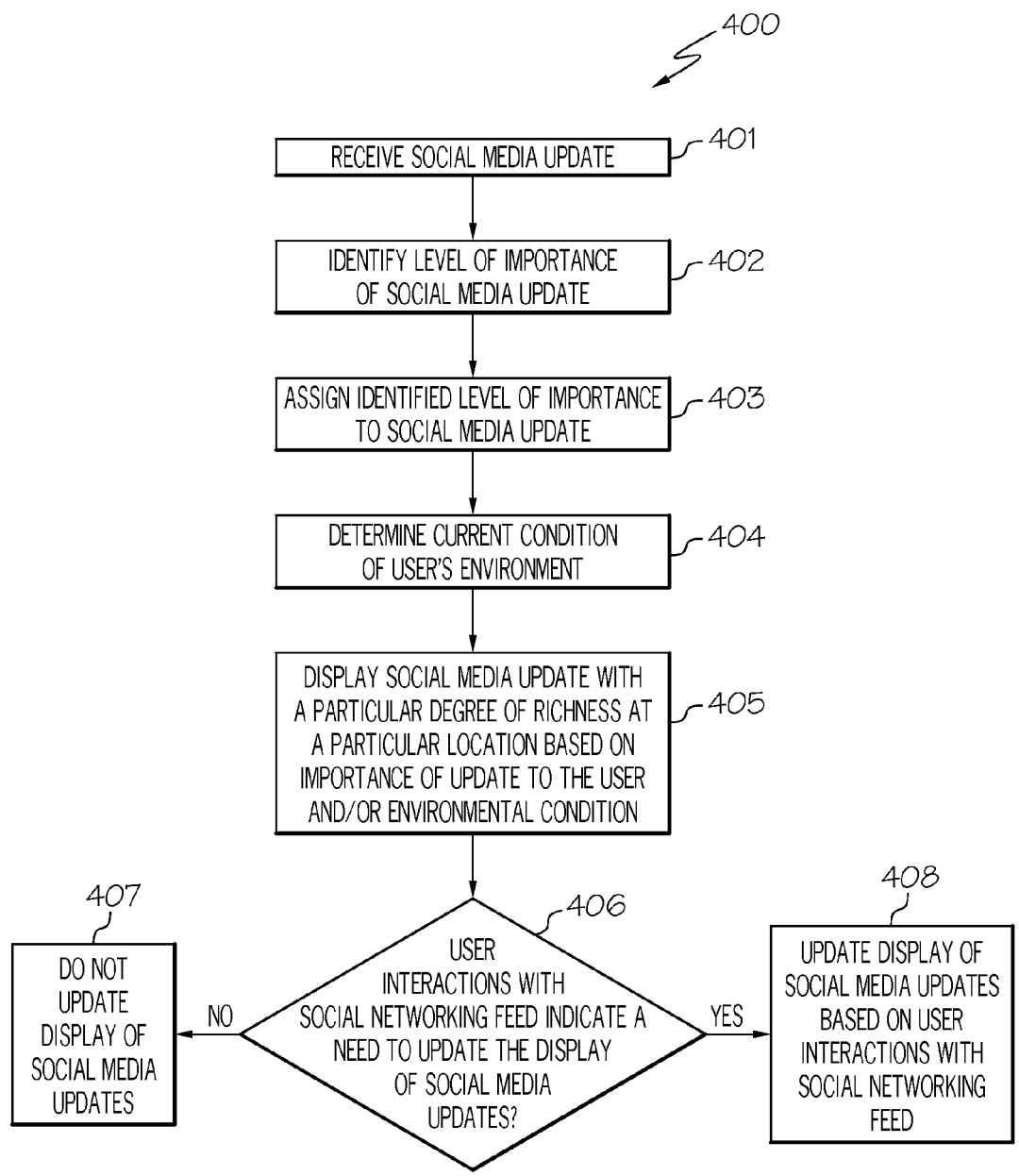
FIG. 4 is a flowchart of a method for adjusting the display of social media updates to varying degrees of richness based on the level of importance of the social media update and/or the current condition of the user's environment in accordance with an embodiment of the present invention.
Figures 5, 6:
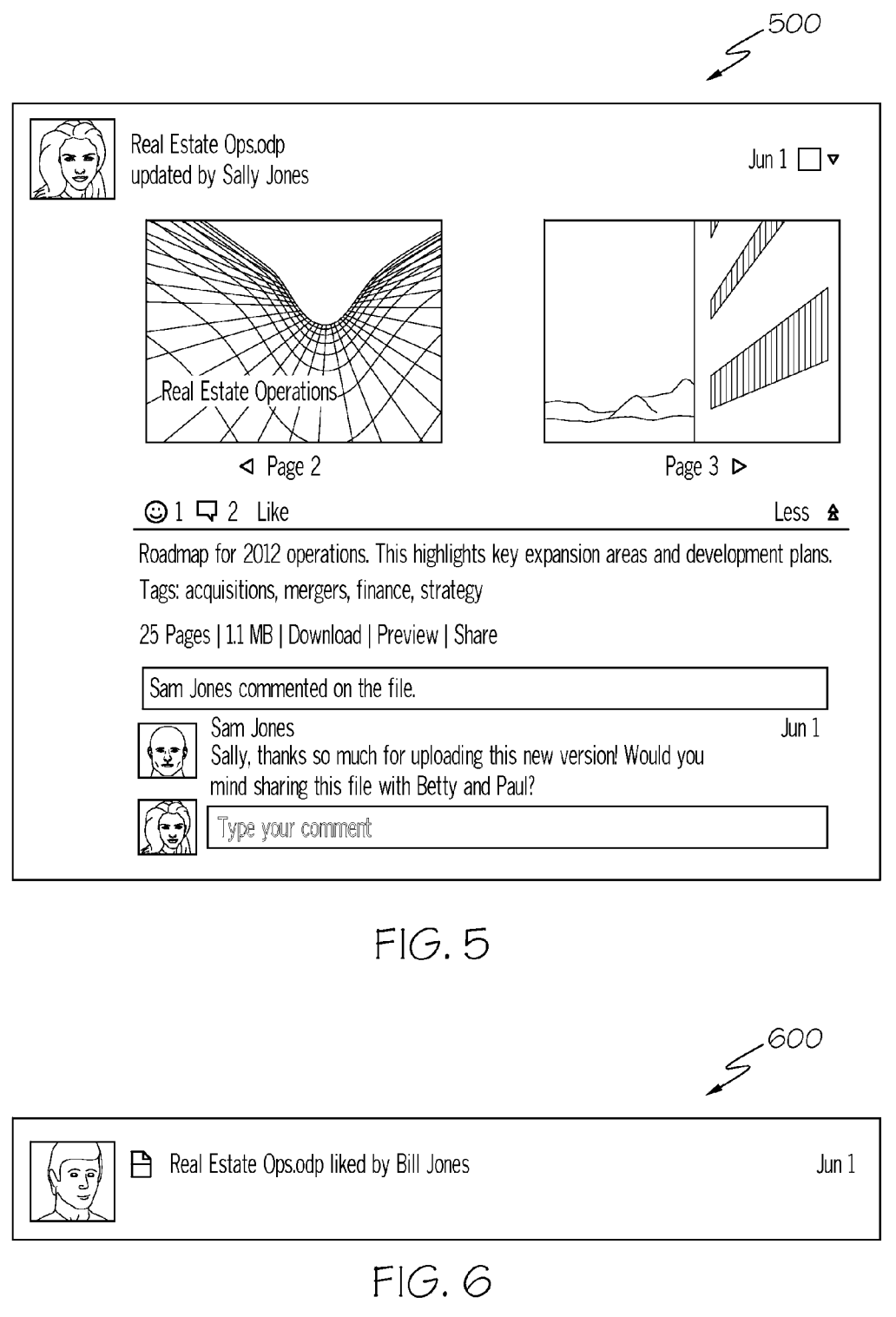
Figure 7:
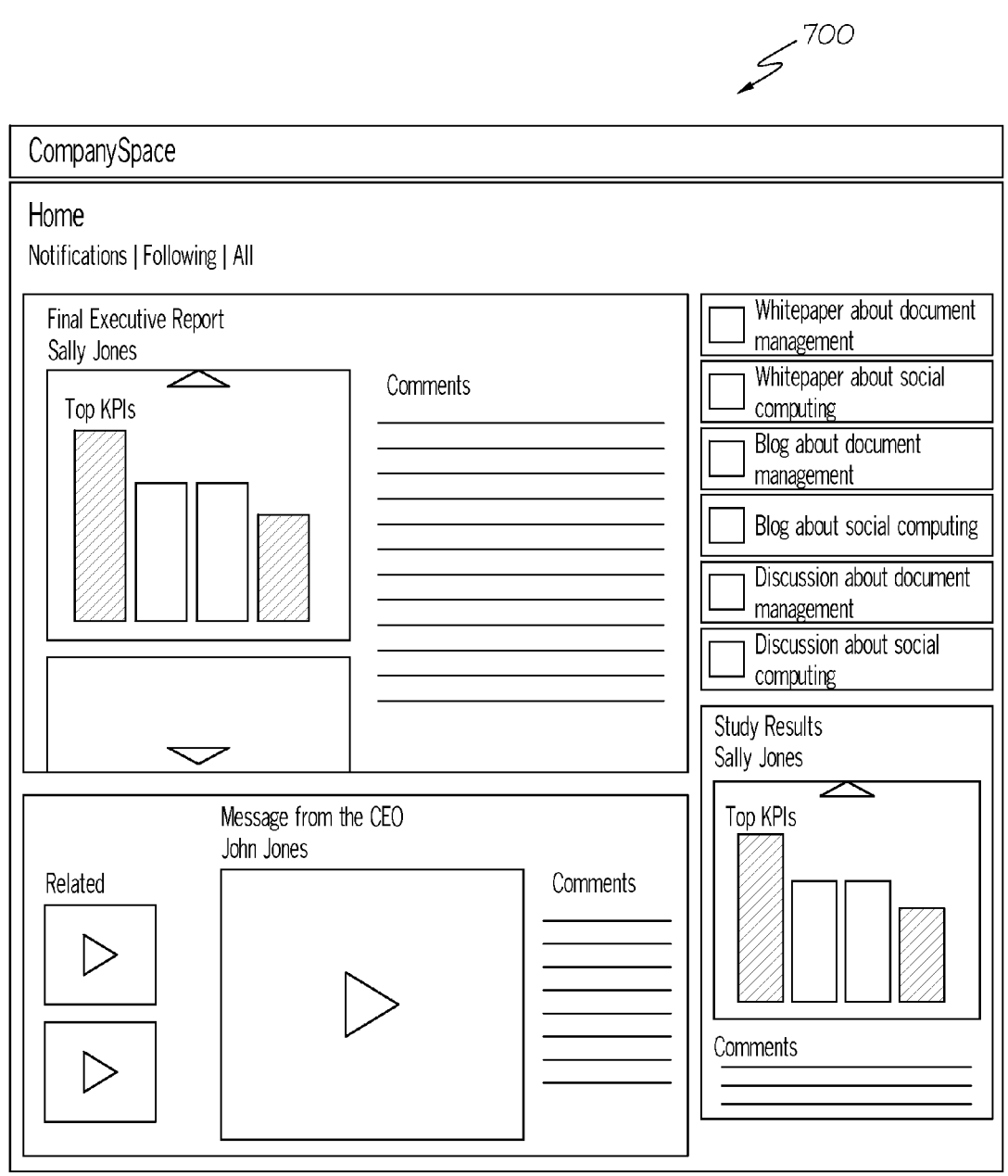
FIG. 7 illustrates a display of a social media update in a social networking feed where the size and location of particular items within the social media update vary according to their relative importance in accordance with an embodiment of the present invention.

The principles of the present invention provide a means for displaying each social media update entry (e.g., news update entry) in a social networking feed with a particular degree of richness based on the level of importance of the social media update and/or the current condition of the user's environment thereby reducing the time required by the user to determine which updates are important to the user as discussed further below in association with FIGS. 3-7. FIG. 3 illustrates the software components used in adjusting the display of social media updates to varying degrees of richness based on the level of importance of the social media update and/or the current condition of the user's environment. FIG. 4 is a flowchart of a method for adjusting the display of social media updates to varying degrees of richness based on the level of importance of the social media update and/or the current condition of the user's environment. FIG. 5 illustrates a display of a social media update in a social networking feed with a high degree of richness. FIG. 6 illustrates a display of a social media update in a social networking feed with a low degree of richness. FIG. 7 illustrates a display of a social media update in a social networking feed where the size and location of particular items within the social media update vary according to their relative importance.

Referring to FIG. 3, as stated above, FIG. 3 illustrates the software components used in adjusting the display of social media updates to varying degrees of richness based on the level of importance of the social media update and/or the current condition of the user's environment in accordance with an embodiment of the present invention. In one embodiment, these software components are the components or modules of the program for adjusting the display of a social media update in a social networking feed to a particular degree of richness based on the level of importance of the social media update and/or the current condition of the user's environment, where the program may reside in application 204 (FIG. 2).

The following provides a brief description of these software components. A more detailed description of these software components is provided in conjunction with FIGS. 4-7, where their functionalities are discussed in connection with the method for adjusting the display of social media updates (e.g., news updates) to varying degrees of richness based on the level of importance of the social media update and/or the current condition of the user's environment.

Referring again to FIG. 3, the software components include an importance identifier 301 configured to identify and assign a level of importance to a social media update. Social media updates (or simply "update"), as used herein, refer to new postings or updates from friends and pages followed by the user (including photo tags, event updates, group memberships and other activity) that are to be reflected in the social networking feed (referred to as the "news feed"). The importance of the social media update can be defined by various aspects, such as topics or people of interest to the user, the user's work assignments, topics related to what the user has already read, etc. In one embodiment, the level of importance of the social media update is based on attributes of the social media update, where the attributes may include the person in the user's social network, a tag followed by the user, a file created by the user, comments made to a content item by other people, etc. For example, if the update included an update from the user's friend in the user's social network, then such an update may be deemed to have a higher importance than an update from an individual outside of the user's social network. The principles of the present invention are not to be limited to the examples discussed above but to include any aspects that may be used to determine an importance of the social media update to the user in question. In one embodiment, importance identifier 301 identifies and assigns one of n levels of importance to each update, where n is a positive integer number. In one embodiment, importance identifier 301 assigns a level of importance to the attributes themselves (e.g., comments made to a content item by other people) within the social media update in addition to assigning a level of importance to the social media update itself.

The software components further include an environmental conditions monitor 302 configured to determine the current condition of the user's environment. For example, the current condition of the user's environment may include a volume of other updates received over a time frame, a current workload of the user, a current time or day, etc. For instance, if the user has a high volume of other updates (e.g., over 100 other updates), then an important social media update may be displayed with a high degree of richness so as to distinguish this social media update from the other updates. However, if the user has a low volume of other updates (e.g., less than 10 other updates), then a social media update, whether important or not, may be displayed with a high degree of richness since there are not many updates for the user to review to determine which of the updates are important to the user. In another example, if the user currently has a high workload, then an important social media update may be displayed with a high degree of richness so as to distinguish this social media update from the other updates. The principles of the present invention are not to be limited to the examples discussed above but to include any condition of the user's environment that may be used to assess a degree of richness that the social media update should be displayed in the social networking feed.

The software components further include a display control 303 configured to determine an amount of richness that the social media update should be displayed in the social networking feed based on the level of importance of the social media update and/or the current condition of the user's environment. "Richness," as used herein, refers to the level of detail of the display. Examples of varying the degree of richness include suppressing or promoting certain metadata of the update, changing the visual display (e.g., changing the size, highlighting certain aspects, displaying text differently from the image, showing various forms (e.g., text and image) of the same metadata) and so forth. In one embodiment, display control 303 determines an amount of richness that the attributes of the social media update should be displayed in the social networking feed based on the level of importance assigned to the attributes and the current condition of the user's environment.

As stated above, a more detail description of the functionality of these software components is provided below in connection with FIGS. 4-7.

FIG. 4 is a flowchart of a method 400 for adjusting the display of social media updates to varying degrees of richness based on the level of importance of the social media update and/or the current condition of the user's environment in accordance with an embodiment of the present invention.

Referring to FIG. 4, in conjunction with FIGS. 1-3, in step 401, news feed display mechanism 104 receives a social media update.

In step 402, importance identifier 301 identifies a level of importance of the social media update as discussed above. In one embodiment, the level of importance of the social media update is based on attributes of the social media update, where the attributes may include the person in the user's social network, a tag followed by the user, a file created by the user, comments made to a content item by other people, etc. For example, if the update included an update from the user's friend in the user's social network, then such an update may be deemed to have a higher importance than an update from an individual outside of the user's social network.

In step 403, importance identifier 301 assigns the identified level of importance to the social media update.

In step 404, environmental conditions monitor 302 determines a current condition of a user's environment as discussed above. For example, the current condition of the user's environment may include a volume of other updates received over a time frame, a current workload of the user, a current time or day, etc.

In step 405, display control 303 displays the social media update in the social networking feed with a particular degree of richness at a particular location based on the identified level of importance of the social media update and/or the current condition of the user's environment. In this manner, the amount of time required by the user to determine which updates are important to the user is reduced. For example, if the current condition of the user's environment indicates a high volume of other updates (e.g., over 100 other updates), then an important social media update may be displayed in a social networking feed with a high degree of richness at a particular location so as to distinguish this social media update from the other updates as illustrated in FIG. 5.

FIG. 5 illustrates a display of a social media update 500 in a social networking feed with a high degree of richness in accordance with an embodiment of the present invention. As illustrated in FIG. 5, social media update 500 includes a high level of detail.

If, however, the social media update is an item of low importance, then the social media update may be displayed in a social networking feed with a low degree of richness at a particular location as illustrated in FIG. 6.

FIG. 6 illustrates a display of a social media update 600 in a social networking feed with a low degree of richness in accordance with an embodiment of the present invention. As illustrated in FIG. 6, social media update 600 includes a low level of detail.

In one embodiment, display control 303 determines an amount of richness that the attributes (e.g., comments made to a content item by other people) of the social media update should be displayed at a particular location in the social networking feed based on the level of importance assigned to the attributes and the current condition of the user's environment. Furthermore, since different attributes in the social media update may be assigned different levels of importance, these attributes may be displayed with a different degree of richness as illustrated in FIG. 7.

FIG. 7 illustrates a display of a social media update 700 in a social networking feed where the size and location of particular items (e.g., comments) vary according to their relative importance in accordance with an embodiment of the present invention. As illustrated in FIG. 7, various items (e.g., comments) within the social media update are displayed at a particular location with different degrees of richness based on the different levels of importance assigned to these items.

Referring to FIG. 4, in conjunction with FIGS. 1-3, in step 406, a determination is made by display control 303 as to whether the user interactions with the social networking feed indicate a need to update the display of the social media updates (including other social media items currently appearing in the social networking feed in addition to the social media update displayed in step 405) based on these user interactions. In this manner, the display of the social media updates can be dynamically updated in real-time based on the user's interactions with the social networking feed. For example, if the user comments or clicks a "like" action on a particular news entry, then that news entry as well as other news entries related to that news entry, such as those sharing a common characteristic, can have its display dynamically updated, such as increasing or decreasing its richness. For instance, if the user makes a positive comment on a particular news entry, then that news entry as well other related news entries can have their richness increased.

If there are no user interactions with the social networking feed to indicate a need to update the display of a social media updates, then, in step 407, display control 303 does not update the display of the social media updates.

If, however, there are user interactions with the social networking feed that indicate a need to update the display of the social media updates, then, in step 408, display control 303 updates the display of the social media updates in real-time based on these user interactions with the social networking feed as discussed above.

In some implementations, method 400 may include other and/or additional steps that, for clarity, are not depicted. Further, in some implementations, method 400 may be executed in a different order presented and that the order presented in the discussion of FIG. 4 is illustrative. Additionally, in some implementations, certain steps in method 400 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product embodied in a non-transitory computer readable storage medium for adjusting a display of social media updates to varying degrees of richness, the computer program product comprising programming instructions for:
    receiving a social media update;
    identifying one of n possible levels of importance of said social media update, wherein said n is a positive integer number, wherein the identified level of importance of the social media update is based on attributes of the social media update, wherein the attributes comprise the following: a person in a social network of a user, a tag the user is following, a file created by the user and comments made to a content item by other people;
    assigning said identified level of importance to said social media update;
    determining a current condition of the user's environment, wherein said current condition of said user's environment comprises a volume of other updates received over a time frame, a current workload of said user, and a current time or day;
    displaying said social media update in a social networking feed with a particular degree of richness at a particular location based on said identified level of importance of said social media update and said current condition of said user's environment, wherein said particular degree of richness is a particular level of detail in displaying said social media update; and
    updating a degree of richness of said social media updates in real time based on interactions with said social networking feed by said user, wherein said interactions comprise said user commenting or clicking an action on an entry in said social networking feed, wherein said entry and other entries related to said entry that share a common characteristic with said entry have their degree of richness dynamically updated in response to said user commenting or clicking said action on said entry in said social networking feed.

2. The computer program product as recited in claim 1, wherein said particular degree of richness comprises suppressing or promoting metadata of said social media update.

3. The computer program product as recited in claim 1, wherein said particular degree of richness comprises changing a visual display by displaying text differently from an image.

4. The computer program product as recited in claim 1, wherein the identified level of importance of the social media update is further based on topics or people of interest to said user, work assignments of said user and topics related to what said user has already read.

5. The computer program product as recited in claim 1, wherein said comments are displayed in said social networking feed at a particular location with a particular degree of richness based on said assigned level of importance to said comments and said current condition of said user's environment.

6. The computer program product as recited in claim 1, wherein said particular degree of richness comprises changing a visual display by showing various forms of metadata of said social media update, wherein said forms comprise text and images.

7. The computer program product as recited in claim 1, wherein said particular degree of richness comprises changing a visual display by highlighting aspects of said social media update.

8. A system, comprising:
- a memory for storing a computer program for adjusting a display of social media updates to varying degrees of richness; and
- a processor coupled to said memory, wherein said processor is configured to execute program instructions of the computer program for:
- receiving a social media update;
- identifying one of n possible levels of importance of said social media update, wherein said n is a positive integer number, wherein the identified level of importance of the social media update is based on attributes of the social media update, wherein the attributes comprise the following: a person in a social network of a user, a tag the user is following, a file created by the user and comments made to a content item by other people;
- assigning said identified level of importance to said social media update;
- determining a current condition of said user's environment, wherein said current condition of said user's environment comprises a volume of other updates received over a time frame, a current workload of said user, and a current time or day;
- displaying said social media update in a social networking feed with a particular degree of richness at a particular location based on said identified level of importance of said social media update and said current condition of the user's environment, wherein said particular degree of richness is a particular level of detail in displaying said social media update; and
- updating a degree of richness of said social media updates in real time based on interactions with said social networking feed by said user, wherein said interactions comprise said user commenting or clicking an action on an entry in said social networking feed, wherein said entry and other entries related to said entry that share a common characteristic with said entry have their degree of richness dynamically updated in response to said user commenting or clicking said action on said entry in said social networking feed.

9. The system as recited in claim 8, wherein said particular degree of richness comprises suppressing or promoting metadata of said social media update.

10. The system as recited in claim 8, wherein said particular degree of richness comprises changing a visual display by displaying text differently from an image.

11. The system as recited in claim 8, wherein the identified level of importance of the social media update is further based on topics or people of interest to said user, work assignments of said user and topics related to what said user has already read.

12. The system as recited in claim 8, wherein said comments are displayed in said social networking feed at a particular location with a particular degree of richness based on said assigned level of importance to said comments and said current condition of said user's environment.

13. The system as recited in claim 8, wherein said particular degree of richness comprises changing a visual display by showing various forms of metadata of said social media update, wherein said forms comprise text and images.

14. The system as recited in claim 8, wherein said particular degree of richness comprises changing a visual display by highlighting aspects of said social media update.

* * * * *